US004001770B2

United States Statutory Invention Registration [19]

[11] Reg. Number: H1770

McJones et al. [45] Published: Jan. 5, 1999

[54] FLOATING ROOF TANK WITH SEALED GAUGING POLE

[76] Inventors: Stephen F. McJones, 2627 Peck Ave., San Pedro, Calif. 90731; Robert J. Middlemore, 5618 E. Patria, Orange, Calif. 92869; Richard Zelenkow, 21514 Howard Ave., Torrance, Calif. 90503

[21] Appl. No.: 938,175

[22] Filed: Sep. 26, 1997

[51] Int. Cl.[6] ..... B65D 88/78

[52] U.S. Cl. ..... 220/560

*Primary Examiner*—Charles Jordan
*Assistant Examiner*—Meena Chelliah

[57] ABSTRACT

A floating roof tank is provided having a fixed vertical pole disposed through an opening in the floating roof. The vertical pole serves as both a gauging pole and an anti-rotational pole. The gauging pole is perforated to allow the free flow of liquid into and out of the gauging pole. A float is disposed within the gauging pole. The float has a pair of spaced-apart seals which effectively prevent the escape of vapor from within the tank through the gauging pole. Other seals effectively prevent the escape of vapor from within the tank around the periphery of the gauging pole and around the periphery of the roof itself. The gauging pole, in combination with the double sealed float, provides the operator of the tank with the ability to sample the tank from the top of the gauging pole, rather than having to stand on the floating roof itself.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

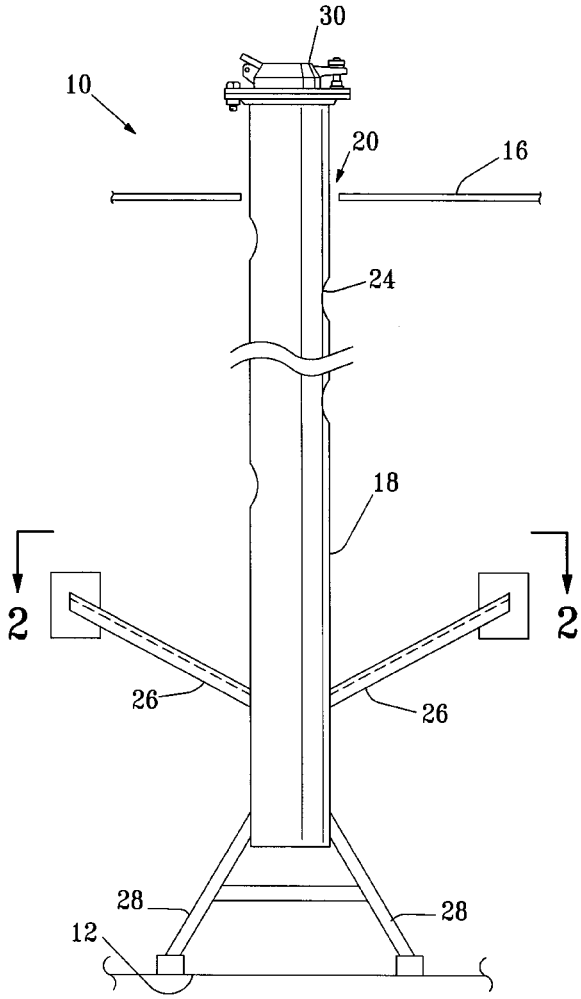

FLOATING ROOF TANK WITH SEALED GAUGING POLE

BACKGROUND

Floating roof tanks are common in the petroleum and chemical processing industries to store volatile liquids. In floating roof tanks, the roof is generally adapted with pontoons so that the roof floats on the surface of the liquid. Seals are typically provided at the peripheral edges of the roof to seal the roof as it floats up and down with the liquid level, thereby preventing the escape of vapors from the tank.

In floating roof tanks, it is typically necessary to provide an opening to allow operators to extract samples of the liquid from the tank. However, using such openings to extract samples requires the operator to physically stand upon the roof of the tank. In many cases, this is somewhat dangerous, such as where the tank may emit toxic vapors. This is especially a problem when the liquid level in the tank is low so that the roof of the tank is well-below the top of the tank's side walls. In such cases, the roof and the tank's side walls form a semi-enclosed space wherein vapors are not readily dispersed in the wind.

Accordingly, there is a need for a floating roof tank which can be sampled without having to stand on the tank roof.

SUMMARY

The invention satisfies this need. The invention is a floating roof comprising (a) a bottom wall; (b) substantially vertical side walls attached to the bottom wall, the side walls defining a top opening; (c) a roof disposed within the side walls, the roof having a central portion, peripheral edges and a gauging opening and being shaped and dimensioned to substantially conform to the top opening, the roof being adapted to float on liquid disposed within the tank and having seals disposed at the peripheral edges to substantially seal vapor within the tank; (d) a hollow gauging pole disposed vertically within the tank and protruding through the gauging opening in the roof, the gauging pole having side walls with an exterior side and an interior side, the gauging pole side walls being perforated to allow liquid within the tank to flow into the gauging pole and having external seals adapted to seal the exterior side of the gauging pole side walls to the tank roof so as to prevent vapor within the tank from escaping through the gauging opening on the exterior side of the gauging pole side walls; and (e) an internal float disposed within the gauging pole adapted to float on liquid disposed within the tank, the float having a pair of spaced apart wiper seals adapted to seal the float to the interior side of the gauging pole side walls so as to prevent the escape of vapor from the tank along the interior side of the gauging pole side walls.

The invention allows operations personnel to sample the floating roof tank of the invention without having to stand upon the floating roof. Operations personnel merely remove the internal float within the gauging pole and sample the tank through the gauging pole. The gauging pole doubles as an anti-rotational pole which prevents the rotation of the floating roof relative to the sides of the tank.

DRAWINGS

These features, aspects and advantages of the present invention will become better understood with regard to the following description, appended claims and accompanying figures where:

DESCRIPTION OF THE INVENTION

Figure 1:
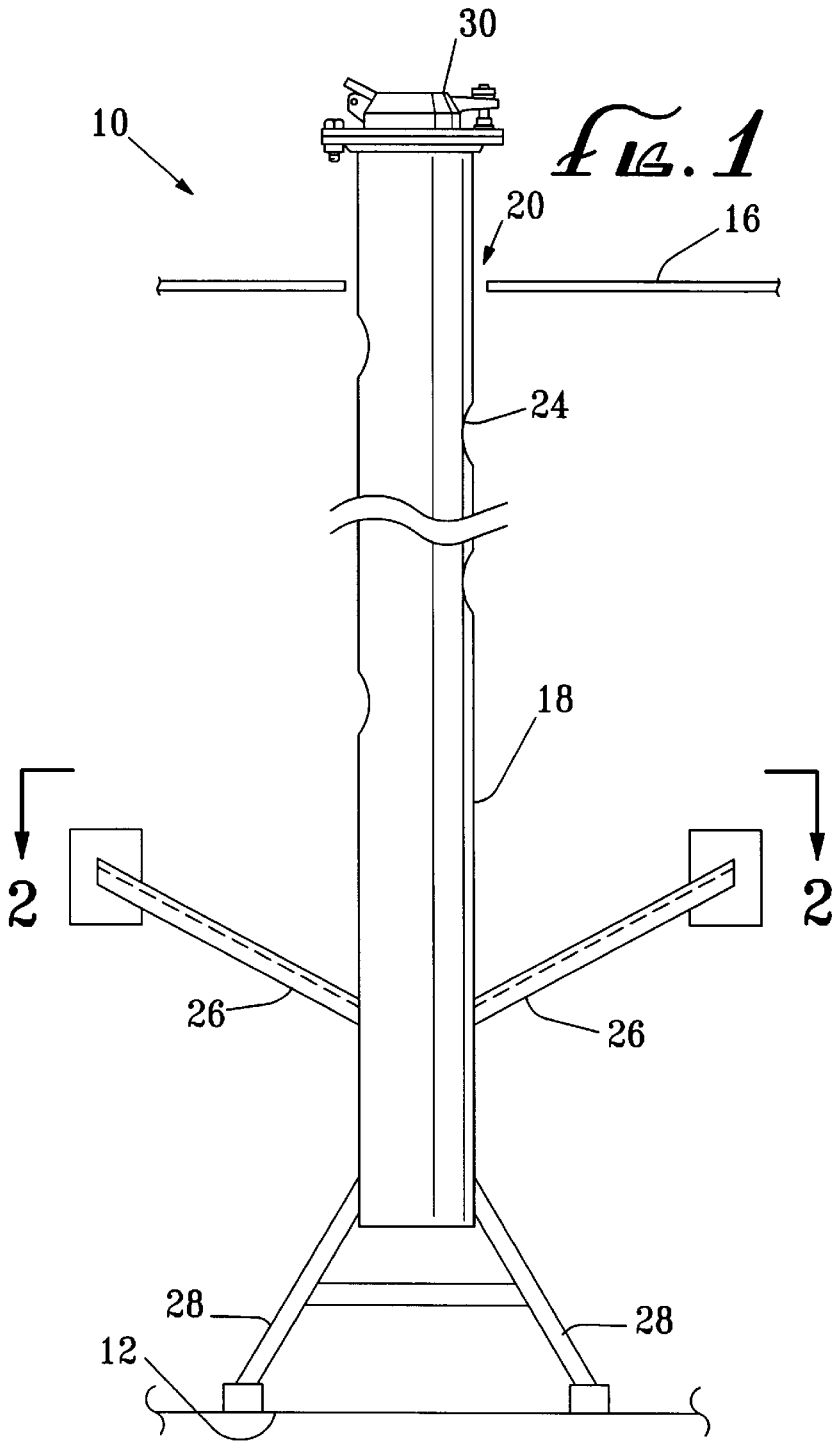
FIG. 1 is a side view of a floating roof tank of the invention.
Figure 2:
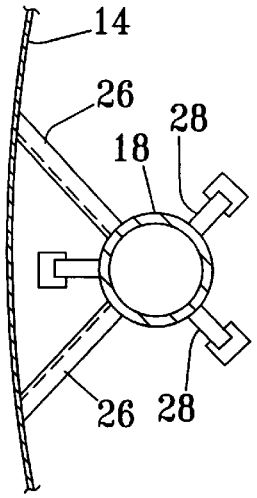
FIG. 2 is a cross-sectional view of the floating roof tank of FIG. 1 taken along line 2—2.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a floating roof tank 10 comprising a bottom wall 12, substantially vertical side walls 14 and a floating roof 16. A hollow gauging pole 18 is disposed vertically within the tank 10 in such a way that it protrudes through a gauging opening 20 defined within the floating roof 16. Disposed within the gauging pole 18 is an internal float 22 which is adapted as described below to alternatively seal the gauging pole 18 and to allow access to the liquid within the tank 10 for sampling purposes.

In a typical embodiment, the hollow gauging pole 18 is a section of pipe, for example, a section of 8-inch, schedule 40 carbon steel pipe. The size and the material of the gauging pole 18 is not critical, however. Other sizes and other materials can be used depending upon the size of the tank 10 and other circumstances.

The gauging pole 18 is perforated to allow liquid within the tank 10 to freely flow into and out of the gauging pole 18. Preferably, the gauging pole 18 is perforated along its entire operative length. This allows for adequate cross-flow of liquids into and out of the gauging pole 18, so that the liquid contents within the gauging pole 18 is representative of the liquid within the tank 10 as a whole. Where the gauging pole 18 is a section of 8-inch, schedule 40 pipe, the gauging pole 18 can be perforated with two rows of one and one eighth inch diameter holes 24 spaced apart by about 18 inches. In a preferred embodiment, the rows of holes 24 are disposed on opposite sides of the gauging pole 18 and the holes 24 of one row are staggered with respect to the holes 24 in the opposite row, as shown in FIG. 1.

In a typical installation, such as that which is shown in FIG. 1, the gauging pole 18 is attached by lateral braces 26 to the side walls 14 of the tank 10 and by vertical braces 28 to the bottom wall 12 of the tank 10.

Optionally, the gauging pole 18 can further comprise a top cap 30.

Figure 3:
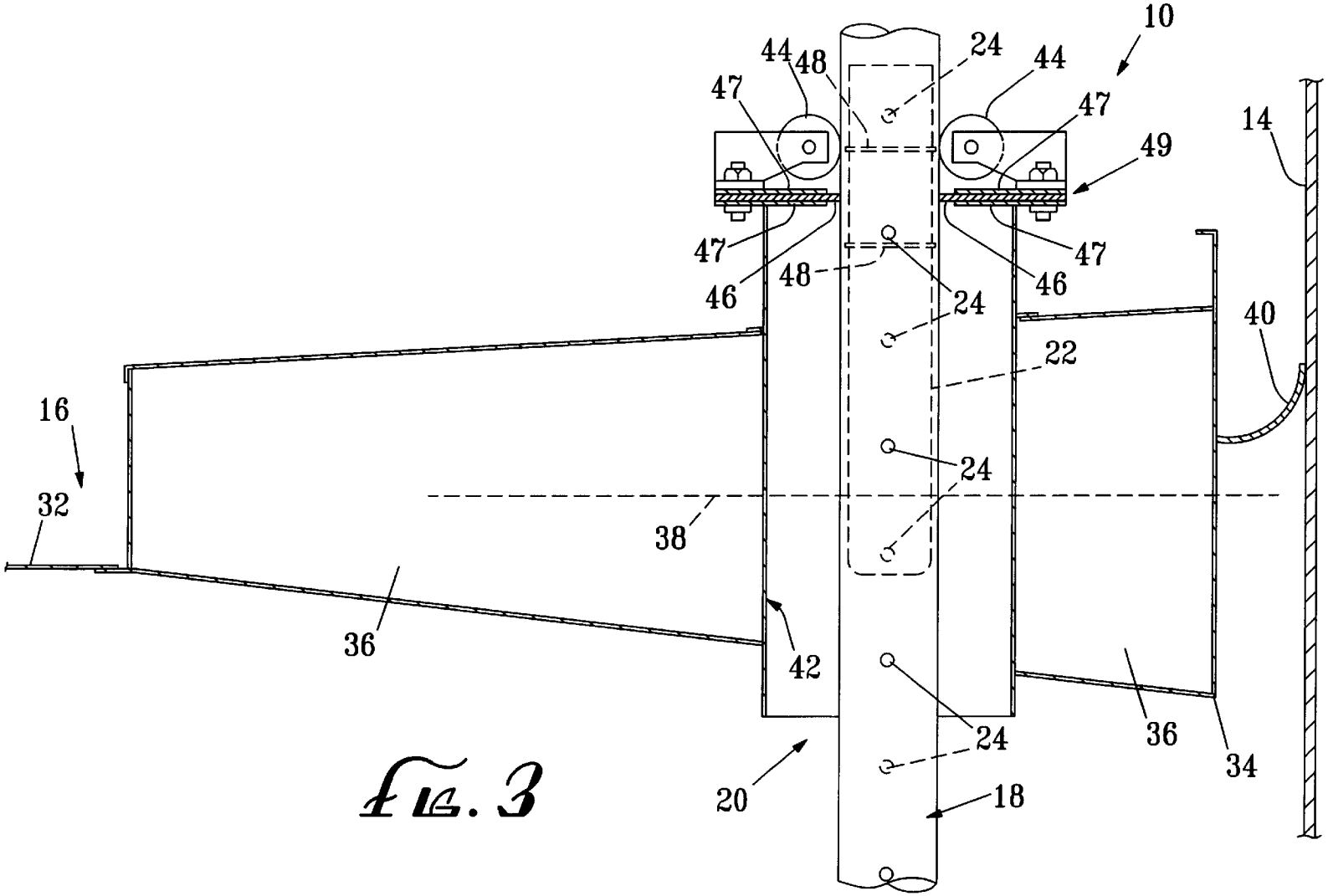
FIG. 3 is a cross-sectional side view showing in detail the gauging pole as it protrudes through the roof of a floating roof tank.
Figure 5:
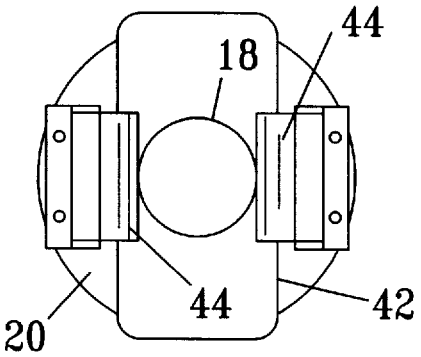
FIG. 5 is a top view of a gauging opening in the roof of a floating roof tank of the invention, showing a gauging pole disposed therein.

As also shown in FIG. 1, and in more detail in FIGS. 3 and 5, the guide pole 18 is sufficiently long so as to protrude through the gauging opening 20 in the tank roof 16 when the tank roof 16 is at its maximum height. FIG. 3 illustrates a typical method of protruding the gauging pole 18 through the gauging opening 20. The tank roof 16 is shown to comprise a center section 32 and a periphery 34. At the periphery 34 are provided pontoons 36 for causing the roof 16 to float on liquid within the tank 10. As shown in FIG. 3, the liquid level is designated by the number 38. At the periphery 34, the roof 16 has flexible periphery seals 40 which are adapted to contact the side walls 14 of the tank 10 with sufficient force so as to effectively prevent vapors within the tank 10 from escaping at the periphery 34 of the roof 16.

At the gauging opening 20, a gauging opening cylinder 42 can be attached to the roof 16. The gauging opening cylinder 42 can be cylindrical in shape, but this is not critical. Rollers 44 or similar equipment can be attached proximate to the gauging opening cylinder 42 on opposite sides of the gauging pole 18 so as to allow the roof 16 to smoothly move up and down the exterior of the gauging pole 18. Gauging pole seals 46 are attached either to the gauging pole 18 or to the tank roof 16 at the gauging opening 20. As shown in FIG. 3, the gauging pole seals 46 can be sandwiched between two metal plates 47 which form a top flange 49 on the gauge opening cylinder 42. The gauging pole seals 46 are flexible sheets of material adapted to impinge upon the exterior walls of the gauging pole 18 with sufficient force so as to prevent the escape of vapor within the tank through the gauging opening 20 on the external side of the gauging pole 18.

Figure 4:
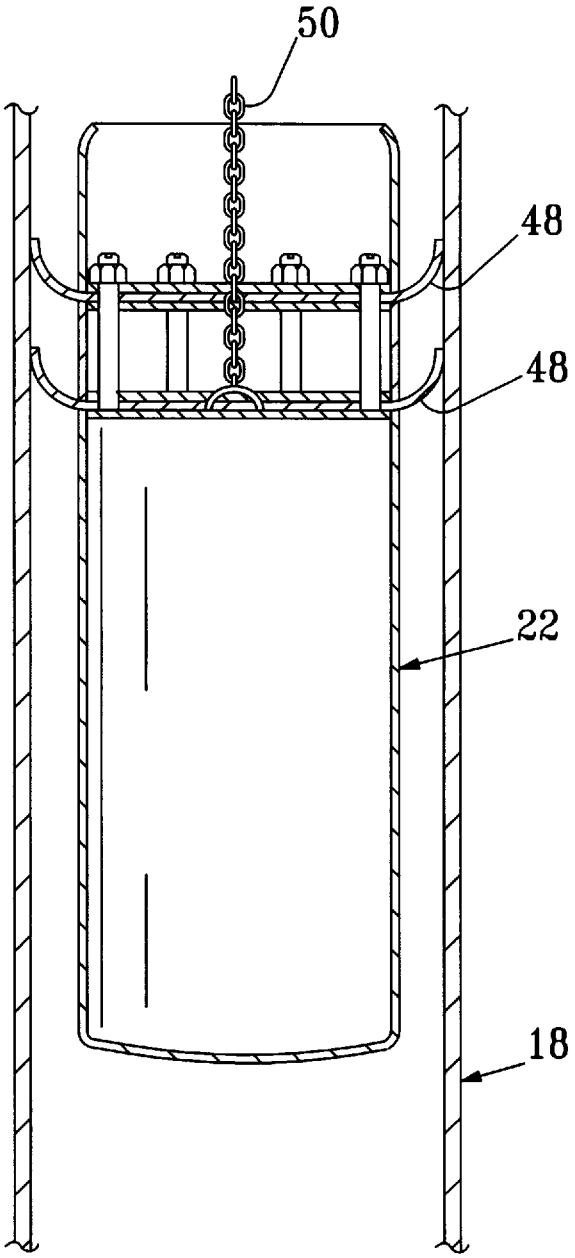
FIG. 4 is a cross-sectional side view of an internal float disposed within a gauging pole useful in the invention.

As shown on FIGS. 3 and 4, the internal float 22 is disposed within the gauging pole 18. The internal float 22 is adapted to float on liquid disposed within the tank 10. The float 22 is typically made from stainless steel, but other materials can be used as well.

As shown in FIG. 4, the float 22 includes a pair of spaced-apart float seals 48 which impinge upon the internal walls of the gauging pole 18 in such a way that vapor is prevented from escaping from the tank 10 via the gauging pole 18. In some applications, a single seal 48 can be used. However, in most applications, two spaced-apart seals 48 are required to adequately prevent vapor from escaping via the perforations 24 in the gauging pole 18. This is clearly seen in FIG. 3. The float seals 48 are made from any suitable sealing material which is compatible with liquids which are to be stored within the tank 10.

As shown in FIG. 4, a chain 50 or similar structure can be attached to the float 22 to facilitate its removal from the gauging pole 18 when samples are to be removed from the tank 10.

Typically, the floating roof tank 10 of the invention will further comprise a suitable platform (not shown) attached to the upper edge of the side walls 14 to allow operations personnel access to the top of the gauging pole 18.

In operation, the floating roof tank 10 of the invention can be partially filled with a volatile liquid. The floating roof 16 is buoyed upward by the buoyancy the pontoons 36 so that the floating roof 16 essentially rests at the top of the liquid. This minimizes any vapor space between the top of the liquid 38 and the bottom of the roof 16. The periphery seals 40 prevent the escape of vapors from around the periphery 34 of the roof 16.

The float 22 is disposed within the gauging pole 18. The gauging pole seals 46 impinge upon the side walls of the gauging opening cylinder 42 to effectively prevent vapor from escaping through the gauging opening 20 on the exterior of the gauging pole 18.

The float 22 is buoyed upwards by its natural buoyancy. A portion of the float 22 is typically disposed below the liquid level 38, with the remainder of the float 22 disposed above the liquid level 38. The float 22, in combination with the pair of spaced-apart float seals 48, effectively prevent the escape of vapor from the inside of the tank 10 through the gauging pole 18.

When operating personnel wish to take samples from the tank 10, such personnel open the top cap 30 on the gauging pole 18 and remove the float 22 using the attached chain 50. In this way, the operating personnel have access to the contents of the liquid within the gauging pole 18 which, because of the perforations 24 in the gauging pole 18, is representative of the liquid in the tank 10 as a whole. The operating personnel extract the required samples and then replace the float 22 within the gauging pole 18 using the chain 50.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A floating roof tank comprising:

(a) a bottom wall;

(b) substantially vertical side walls attached to the bottom wall, the side walls defining a top opening;

(c) a roof disposed within the side walls, the roof having a central portion, peripheral edges and a gauging opening and being shaped and dimensioned to substantially conform to the top opening, the roof being adapted to float on liquid disposed within the tank and having seals disposed at the peripheral edges to substantially seal vapor within the tank;

(d) a hollow gauging pole disposed vertically within the tank and protruding through the gauging opening in the roof, the gauging pole having side walls with an exterior side and an interior side, the gauging pole side walls being perforated to allow liquid within the tank to flow into the gauging pole and having external seals adapted to seal the exterior side of the gauging pole side walls to the tank roof so as to prevent vapor within the tank from escaping through the gauging opening on the exterior side of the gauging pole side walls; and (e) an internal float disposed within the gauging pole adapted to float on liquid disposed within the tank, the float having a pair of spaced apart wiper seals adapted to seal the float to the interior side of the gauging pole side walls so as to prevent the escape of vapor from the tank along the interior side of the gauging pole side walls.

* * * * *